(12) United States Patent
Yang et al.

(10) Patent No.: US 12,452,319 B2
(45) Date of Patent: Oct. 21, 2025

(54) VOICE CALL DEVICE

(71) Applicant: INNOPEAK TECHNOLOGY, INC., Palo Alto, CA (US)

(72) Inventors: Jaehyeuk Yang, Palo Alto, CA (US); Xin Xu, Palo Alto, CA (US); Yongsheng Shi, Palo Alto, CA (US)

(73) Assignee: INNOPEAK TECHNOLOGY, INC., Palo Alto, CA (US)

( * ) Notice: Subject to any disclaimer, the term of this patent is extended or adjusted under 35 U.S.C. 154(b) by 282 days.

(21) Appl. No.: 18/300,159

(22) Filed: Apr. 13, 2023

(65) Prior Publication Data

US 2023/0262099 A1 Aug. 17, 2023

Related U.S. Application Data

(63) Continuation of application No. PCT/US2021/055233, filed on Oct. 15, 2021.

(60) Provisional application No. 63/092,252, filed on Oct. 15, 2020.

(51) Int. Cl.
*H04L 65/1073* (2022.01)
*H04L 65/1016* (2022.01)
*H04L 65/1096* (2022.01)
*H04W 36/00* (2009.01)

(52) U.S. Cl.
CPC ...... *H04L 65/1073* (2013.01); *H04L 65/1016* (2013.01); *H04L 65/1096* (2013.01); *H04W 36/00226* (2023.05)

(58) Field of Classification Search
CPC ............. H04L 65/1073; H04L 65/1016; H04L 65/1096; H04L 47/74; H04L 47/824; H04L 47/826; H04L 12/66; H04W 36/00226; H04W 48/18
See application file for complete search history.

(56) References Cited

U.S. PATENT DOCUMENTS

| 2015/0181513 A1 | 6/2015 | Sharma |
| 2016/0150497 A1 | 5/2016 | Janosi et al. |
| 2018/0132141 A1 | 5/2018 | Huang-Fu et al. |

(Continued)

FOREIGN PATENT DOCUMENTS

| CN | 107333302 | 11/2017 |
| CN | 111107058 | 5/2020 |
| CN | 111698772 | 9/2020 |

OTHER PUBLICATIONS

EPO, Extended European Search Report for EP Application No. 21881195.8, Mar. 18, 2024.

(Continued)

*Primary Examiner* — Eric Myers
(74) *Attorney, Agent, or Firm* — Hodgson Russ LLP

(57) ABSTRACT

The voice call device includes a processor, and a memory having instructions stored thereon, which, when executed by the processor, cause the processor to perform operations as follows. After a voice call is initiated via a user equipment (UE) device over 5G NR, a status of an IMS registration (e.g., failed, in progress, etc.) for the UE is identified. For example, in response to determining that the status of IMS registration for the UE is in-progress, the voice call can be held, and a wait timer initiated. If the IMS registration completes prior to the wait timer expiring, the voice call is conducted over 5G NR or 4G Long-term Evolution (LTE).

8 Claims, 6 Drawing Sheets

(56) References Cited

U.S. PATENT DOCUMENTS

| | | |
|---|---|---|
| 2018/0206169 A1 | 7/2018 | Liu |
| 2020/0053134 A1 | 2/2020 | Niemi et al. |
| 2020/0112887 A1 | 4/2020 | Kwok et al. |
| 2020/0314702 A1 | 10/2020 | Rahman |
| 2021/0105691 A1* | 4/2021 | Zhu .................... H04L 65/1016 |
| 2023/0007054 A1* | 1/2023 | Huang ................ H04L 65/1073 |

OTHER PUBLICATIONS

WIPO, International Search Report and Written Opinion for PCT/US2021/055233, Mar. 3, 2022.
CNIPA, First Office Action for CN Application No. 202180070047.3, Jun. 30, 2025.

* cited by examiner

VOICE CALL DEVICE

CROSS-REFERENCE TO RELATED APPLICATIONS

The present application is a continuation of International Application No. PCT/US2021/055233, filed on Oct. 15, 2021, which claims priority to U.S. Provisional Patent Application No. 63/092,252, filed Oct. 15, 2020, the entire disclosures of the above-mentioned applications are incorporated by reference herein.

DESCRIPTION OF RELATED ART

Fifth-generation wireless (5G) technology has been engineered to greatly increase the speed and responsiveness of wireless networks, which enhancing voice services over 5G networks. The present application generally relates to telecommunications and broadband cellular networks, particularly to a voice call device.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
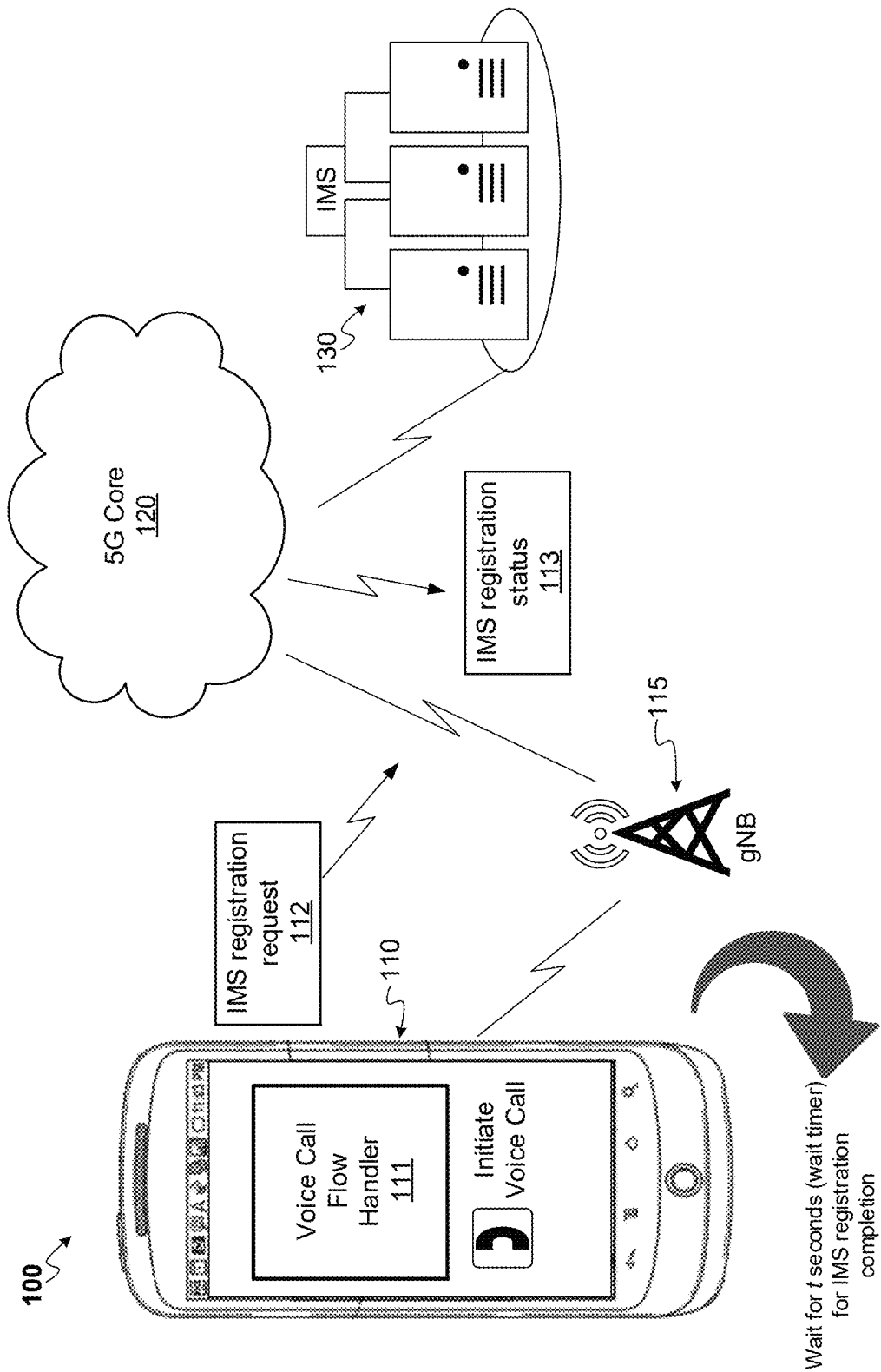
FIG. 1 depicts an example computing system, such as a mobile computing device, implementing the voice call over 5G flow handing procedures, in accordance with embodiments of the application.

The figures are not exhaustive and do not limit the present disclosure to the precise form disclosed.

DETAILED DESCRIPTION

Fifth-generation wireless (5G) is an iteration of a cellular technology standard for broadband cellular networks, required by International Mobile Telecommunications as the standard to support an all Internet Protocol (IP) network. 5G technology supports faster data rates, higher connection density, and much lower latency. 5G was deployed as the planned successor to the 4G networks which provide connectivity to most current cellphones. 5G technology has been engineered to greatly increase the speed and responsiveness of wireless networks. With 5G, data transmitted over wireless broadband connections can travel at multi-gigabit speeds, with potential peak speeds as high as 20 gigabits per second (Gbps) by some estimates. These speeds greatly exceed wireline network speeds and offer latency of 1 millisecond (ms) or lower, which is useful for applications that require real-time feedback. Thus, 5G technology can enable a sharp increase in the amount of data transmitted over wireless systems due to more available bandwidth and advanced antenna technology.

Although 5G is considered a main driver for enhanced data services, voice and video remain key elements to subscribers. As the number of worldwide voice subscriptions and the demands from subscribers continues to grow, cellular providers must offer an increasing amount of voice services. Telecommunication networks have evolved from circuit-switched (CS) 2G networks, with an initial focus on telephony, to fully packet-switched (PS) 4G networks focused on Internet data communications. Additionally, the increase of device penetration is forcing network traffic to move from the circuit-switched domain (3G/2G) to the packet-switched domain. This allows operators to re-use the 3G/2G spectrum for new technologies and reduce the operational cost of legacy technologies while improving the network capacity and performance. Moreover, there are other benefits of leveraging all packet-based voice services, such as VOLTE. For example, packet-based voice services brings a richer customer experience by introducing new features such as HD voice, video calling, and Rich Communication Services (RCS). Packet-based voice services can also enable faster network technology migration by simplifying the network architecture and retiring the older technology layers. With the deployment of 5G, and with limited spectrum supporting all technologies, it is even more critical for cellular providers to include Voice over New Radio (VoNR) services (which supports 5G-based voice services) and migrate customers to 5G.

In some deployments, the 5G network is implemented as a stand-alone network. For example, in 5G NR, a voice call is supported entirely over the packet switching (PS) domain with IP Multimedia Subsystem (IMS) signaling and media. Similar to 4G Long Term Evolution (LTE) networks. 5G voice calls are implemented as end-to-end voice over IP (VOIP) connections managed by the IMS core. In other words, the IMS core provides voice as a 5G application service. Voice and video communications services in 5G networks can be implemented on top of the IP data connection. Therefore, the IMS architecture plays an increasingly important role in 5G VoNR. Unlike voice services provided by external applications (i.e. so-called OTT speech services), voice over IMS supports quality of service (QOS) management across the entire 5G system (5GS). While IMS can provide voice services for various types of access (e.g., fixed, cable and 2G/3G) as well as for 5G deployments, 5G is not as flexible. In many cases, 5G NR and VoNR must utilize an IMS network to handle the voice services, even across the many deployments that are possible for voice over 5G networks. Thus, in order to conduct a voice call entirely over 5G, the UE must successfully register with the IMS.

As a result, when a user initiates a voice call, but the IMS registration has failed or the IMS registration is still in progress (e.g., IMS registration status is not registered), the voice call may be immediately rejected because the UE has not registered with the IMS prior to the call. Also, in a scenario where there is a permanent IMS registration failure on 5G NR, it is possible for the 5G NR to be disabled on the UE in order to use a legacy network, such as 4G LTE or CS radio access technology (RAT) (e.g., 2G GSM and/or 3G WCDMA). While disabling 5G does avoid the UE being stuck in 5G (while the IMS is not registered), it also causes the UE to not have voice service enabled until it is registered over another network, like 4 G LTE or CS RAT. If occurrences of rejected voice calls and/or loss of voice services becomes wide-spread due to these types of circumstances, it may negatively impact the overall user experience for 5G networks. Thus, in order to improve the user's experience when conducting voice calls in a 5G NR deployment, the disclosed methods allow the flow for handling voice call establishment to be dynamically adjusted in a manner that considers the IMS.

Embodiments of the application provide distinct methods and system for improving the overall experience for users conducting voice calls over 5G, despite an adverse status or failure of IMS registration. Particularly, after a voice call is initiated via a user equipment (UE) device over 5G, the disclosed techniques can identify a status of an IMS registration (e.g., failed, in progress, not in progress, etc.) that is associated with the voice call. Thereafter, the voice call handling functions may be adjusted in a manner that is deemed most efficient and reliable for completing the voice call based on the identified status. The disclosed embodiments may avert unnecessary delays, prevent failures, and improve reliability associated with conducting voice calls in 5G networks, thereby increasing the call success rate of the UE and enhancing the user's experience in 5G networks.

Referring now to FIG. 1, an example of a communications network environment 100 for a broadband cellular network in which the mobile computing device 110 (which is also referred to a voice call device or a 5G-enabled mobile computing device) employing the disclosed techniques for improving voice calls over 5G may be employed. The mobile computing device 110 can be a UE that has 5G capabilities. In the example of FIG. 1, the mobile computing device 110 is shown as a handheld user device, and more specifically a smartphone. However, the mobile computing device 110 may be implemented as various other wireless devices that are used directly by an end-user to communicate and equipped with telecommunication functions, such as voice, video, and text. For example, the mobile computing device 110 may also be implemented as a cellular telephone, a laptop computer equipped with a mobile broadband adapter, or other computing device. Accordingly, as a 5G-enabled smartphone, the mobile computing device 110 is capable of supporting enhanced data services, voice (e.g., voice calls over 5G NR. VoNR, etc.), video, and other telecommunication functions that are commonly employed by subscribers to broadband cellular networks. Furthermore, the mobile computing device 110 is depicted to include a voice call flow handler 111 that implements the disclosed techniques for improving the experience for users conducting voice calls over 5G, as described in greater detail herein.

As previously alluded to, there are various deployments that can be used to implement a 5G network. For example, in a non stand-alone (NSA) deployment mode. LTE plus NR with an evolved packet core (EPC) may be employed. In contrast, there is a stand-alone (SA) deployment mode that involves NR with the 5G core (5GC). In addition, there are 5G deployments where cellular network providers can have an existing 4G LTE network, and a 5G network is deployed alongside of the legacy network. In this way. 5G NR serves as a secondary cell and the core technology remains the EPC. The disclosed techniques, for example the voice call flow handler 111 on the mobile computing device 110, can be employed for voice calls over a 5G network that has been set-up using any of the aforementioned deployment modes. FIG. 1 shows a communications network environment 100 for a 5G network having an example deployment that includes: the mobile computing device 110 (or UE); a gNodeB (gNB) 115; a 5GC 120; and an IMS 130.

In the example of FIG. 1, the mobile computing device 110 may be employed by a user that is subscribed to a cellular provide that supports 5G. Thus, the mobile computing device 110 may comprise hardware, software applications, and the like, which allows the mobile computing device 110 to be configured for 5G capability. Accordingly, a user can employ their mobile computer device 110 for multimedia telephone services including audio, video, and text, and particularly to voice calls over the 5G network in environment 100. The mobile device 110 can include an operating system that provides an interface between the mobile computing device's 110 hardware (e.g., the input/output mechanisms and a processor executing instructions retrieved from computer-readable medium) and software. Example operating systems include ANDROID, CHROME, IOS, MAC OS X, WINDOWS 7, WINDOWS PHONE 7, SYMBIAN, BLACKBERRY. WEBOS—a variety of UNIX operating systems; or a proprietary operating system for computerized devices. The operating system may provide a platform for the execution of application programs that facilitate interaction between the computing device and a user.

The mobile computing device 110 may include other applications, computing sub-systems, and hardware. The voice call flow handler 111 can be implemented on the mobile computing device 110 as hardware, a stand-alone processor, firmware, a software application, or any combination thereof. According to the disclosed embodiments, the voice call flow handler 111 may receive an indication of a user initiating an outgoing voice call and/or receiving an incoming voice call, where there voice calls are intended to be supported over 5G. The voice call flow handler 111 is configured to dynamically adjust a flow for handling voice calls over 5G in a manner that is deemed most efficient and reliable for completing the voice call based on an identified status of the UE's registration to IMS. An example function of the voice call flow handler 111 to enhance the user's experience regarding voice services in 5G network is described below in detail.

Also FIG. 1 shows that the communications network environment 100 includes a gNB 115. The gNB 115 is a 5G Base Station that uses New Radio (NR) technology. The NR access technology for 5G can be generally described as a replacement for LTE, and thus the new base station for NR is the gNB 115. The gNB 115, acting as a 5G wireless base station, is illustrated in FIG. 1 as transmitting and/or receiving communications between the mobile device 110 (or UE) and the mobile network. FIG. 1 illustrates the gNB providing a cell within the 5G network coverage which can be used for transmission of voice, data, and other types of content via the 5GC 120.

The 5GC 120 can be described as the part of the 5G network deployment that provides 5G services to mobile subscribers, such as the user of mobile computing device 110, through the radio access network (RAN), for instance the 5G NR RAN. The 5GC 120 can also serve as a gateway to other networks, such as the public switched telephone network, public cloud, and the IMS 130. In the example, the 5GC 120 connects to IMS 130 supporting voice services. The IMS 130 is a standardized architectural framework for delivering IP multimedia services. Furthermore, the IMS 130 provides connection management for voice services in 5G, like in legacy LTE networks. IMS 130 utilizes IP-based Session Initiation Protocol (SIP), which enables the system to be leveraged to support voice services over an IP packet-switched network.

In some 5G deployments, the NR does not support voice services. Thus FIG. 1 illustrates an example where the 5GC 120 offers a connection to IMS 130 to support voice over 5G. In order for the mobile computer device 110 to conduct a voice call over 5G, it may be a requirement for the device 110 to first register with IMS 130 that is supporting voice services prior to connecting the voice call. From a high-level perspective, voice services that run over the 5G, such as VoNR, are voice over IP using the IMS 130 infrastructure. This requirement to register to IMS 130 can cause a number of issues in supporting voice over 5G that may degrade the user's experience, as previously described, including increasing the risk of a large number of call drops.

In accordance with the embodiments, the mobile computing device 110 can include the voice call flow handler 111, which enables the UE, namely mobile computer device 110, to execute several procedures that adjusts the flow for handling the voice call over 5G particularly based on the status of the UE's registration to IMS 130 in order to prevent negative impacts, such as delays and rejected calls. FIG. 1 illustrates an example of one such procedure that is implemented by the voice call flow handler 111, according to the disclosed techniques.

In operation, a user can initiate a voice call using their 5G-enabled mobile computing device 110. For example, the user can press a displayed icon 155 from the device's 110 user interface to start a voice call, which initiates a call flow for establishing a UE originated voice session over 5G NR. Prior to connecting the call, the mobile computing device 110 must begin a procedure to register with the IMS 130. The registration procedure involves the UE, shown as mobile computing device 110, and the network exchanging the parameters and capabilities of both entities. The registration procedure can start with the UE, namely mobile computing device 110, establishing an IMS data network name (DNN) packet data unit (PDU) session in 5GC 120 which allows the UE to register in IMS 130 as a prerequisite for voice session setup. As depicted in FIG. 1, the mobile computing device 110 can transmit a registration request message 112. In a registration request message 112, a UE can indicate its usage setting to the network. The usage setting can be data centric or voice centric. As the mobile computing device 110 has initiated a voice call, the UE usage setting in the registration request message 112 will indicate voice centric mode. Also, the registration request 112 can indicate the mobile computing device's 110 IMS-related parameters. Common IMS parameters the UE may support are, for example, the indication of voice over E-UTRA support, voice over secondary cell group (SCG) bearer support and an indication of voice fallback into EPS. The 5GC 120 receives the registration request 112, and will provide a proper response depending on the network capabilities or offerings. Not all steps that are involved in the procedure for the mobile computer device's 110 registration in IMS is described for brevity. Generally, the objective is to register the UE primarily in the 5G network, even if voice services are not supported (and a handover to LTE would be required). Nonetheless, there may be circumstances, such as the mobile computing device 110 currently being in an area that has poor 5G coverage, that may stall the exchange of communication between the entities in the registration procedure. Since the registration procedure is not completed, the mobile computer device 110 is not yet fully registered in IMS 130. As a result, the 5GC 120 may send, in response to the IMS registration request 112, an IMS registration status message 113 that indicates the IMS registration is currently not completed (e.g., IMS registration is still in progress).

After receiving the IMS registration status message 113 from the 5GC 120, the mobile computer device 110 has data that enables the voice call flow handler 111 to become aware that it is not successfully registered to IMS 130. In some existing UEs, the response to not being registered to IMS 130 (and thus not properly set-up for connections to IMS 130 supporting voice services over 5G) would be to immediately reject the voice call (e.g., NR does not support voice services over 5G). In contrast, the voice call flow handler 111 does not immediately reject the voice call in the case where the IMS registration status is "in progress" (e.g., not registered), and is configured to initiate a wait procedure which allows for an additional amount of time for the IMS registration procedure to successfully complete (mobile computing device 110 registered to IMS 130). In an embodiment, the voice call flow handler 111 can start a wait timer that is set to a defined time period, for instance 30 seconds, prior to taking action. Thus, for example, the 5G coverage may improve (e.g., stronger signal) during this wait period and the voice call flow handler 111 can identify that the device 110 is able to register to IMS 130 prior to the wait timer expiring. The voice call flow handler 111 can then continue as intended and establish the voice call over 5G NR. Consequently, by dynamically adjusting the flow for handing a UE originated voice session over NR based on the IMS registration, such as the aforementioned wait procedure, the voice call flow handler 111 can avoid and/or substantively reduce voice calls being dropped, and thereby enhance voice services over 5G NR for subscribers. Further details regarding the various procedures that can be implemented to control the flow for handling voice calls to enhance voice services in 5G, in accordance with the disclosed embodiments, will now be described in reference to FIG. 2-FIG. 5.

Figure 2:
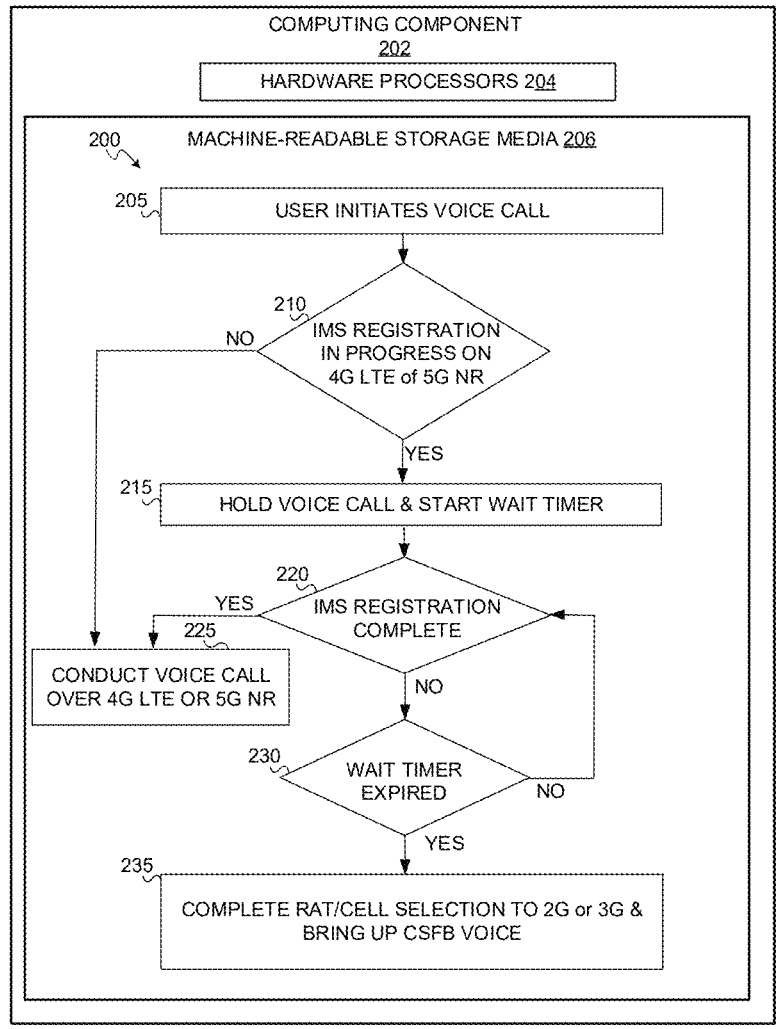
FIG. 2 is an operational flow diagram illustrating an example of a voice call over 5G flow handing procedure that is based on a status of IMS registration, in accordance with some embodiments.

Further details of dynamically modifying the flow for a voice call over 5G NR, according to the disclosed embodiments, are now described with reference to FIG. 2. A flowchart is shown in FIG. 2, illustrating an example of a process 200 that is performed according to one embodiment of the systems and methods described herein. As seen in FIG. 2, process 200 is illustrated as a series of executable operations in a machine-readable storage media 206 performed by a hardware processor 204. The computing component 202 can be a computer device used for telecommunication functions, such as voice, video, and text, that are supported over a 5G network. For example, the computing component 202 may be the 5G-enabled mobile computer device (e.g., smartphone) described above in reference to FIG. 1. Generally, process 200 implements a voice call flow handling procedure that is dependent on an IMS registration status, and further involves waiting for IMS registration completion, according to some embodiments.

The process 200 can begin at operation 205, where the user initiates a voice call. For example, the user can dial a 5G-enabled mobile computing device (i.e., UE) for an outgoing voice call, which initiates a call flow for establishing a UE originated voice session over 5G NR. As previously described, a UE is required to first register in IMS in order to utilize the IMS supported voice services over IP needed to conduct the voice call. Thus, the process 200 continues by performing a conditional check at operation 210 to determine the status of the IMS registration that is associated with the initiated voice call.

At operation 210, the process 200 determines whether the IMS registration is currently "in progress" in 5G NR or 4G LTE. In some embodiments, the status of the IMS registration is received by the UE as a response from the 5GC core in a procedure that is used to register a UE in IMS. For example, the IMS registration status may be communicated as a registration status message or as registration status indication flag within a message that includes other parameters and data associated with the IMS for coordinating voice call services provided by IMS. Specifically, the process 200 uses the status of the IMS registration to determine the appropriate subsequent action that is performed to accordingly handle the voice call. If it is determined that the status of the IMS registration is not "in progress" it may be an indication that the IMS registration is complete (shown as "No" in FIG. 2). In this case, operation 210 can make the determination the UE that initiated the voice call is now registered to IMS. As a result, the process 200 can continue to operation 225 where the UE originated voice session is established and conducted over either 5G NR or 4G LTE, based on the 5G deployment.

Referring back to operation 210, if it is determined that the status for IMS registration is "in progress" (shown as "Yes" in FIG. 2), that can serve as an indication that there may be conditions temporarily stalling the registration procedure (e.g., poor 5G coverage in an area). This is in contrast to immediately rejecting the voice call based on the assumption that there is a permanent failure and the UE cannot be registered to the IMS. Thus, the process 200 involves a wait period, referred to as wait timer, which allows additional time for the IMS procedure to complete successfully, for instance if conditions improve. Accordingly, the process 200 proceeds to operation 215.

Subsequently, at operation 215, the process 200 can begin the wait procedure by holding the voice call and starting a wait timer. The wait timer can be a defined time period, for example t seconds, that is stored or dynamically calculated by an entity in the network, such as the UE. In some embodiments, the time period for the wait timer can be calculated, or otherwise defined, based on evaluating the history data of previously completed IMS registrations associated with voice calls over 5G and/or 4G LTE for the UE. For example, an average IMS registration completion time for a number of previous 5G and/or 4G LTE voice calls may be calculated. The waiter timer can be defined based on this average IMS registration completion time or other associated calculations that may be appropriate, such as probabilities, maximum, minimum, mean and the like. During the time period associated with the wait timer, the process 200 can perform operations 220-230. The operations 220-230 may be considered as a wait procedure, or a sub-process of process 200 that is executed iteratively during the defined time period, prior to the wait timer expiring.

Next, at operation 220, a conditional check is performed to determine whether the IMS registration is complete. Operation 220 can involve receiving one or more additional IMS registration status messages from the 5GC which indicate the current status of the IMS registration, for instance if the IMS registration is still "in progress", "completed" indicating that the US is register to IMS, or "failed". If a result of the check shows that IMS registration is complete (shown as "Yes" in FIG. 2), it can be determined that the UE has successfully become registered to IMS and can use the IMS-supported voice call over IP features. Perhaps, during the allotted wait period, a condition in the 5G network has changed to now allow the IMS registration procedure to continue to completion, although it was temporary stalled previously. Thus, if the UE's IMS registration has completed, the process 200 can continue to operation 225 where the UE originated voice session is established and conducted over either 5G NR or 4G LTE, based on the 5G deployment. This portion of the call handling flow ensures that the voice call is completed as intended (over 5G or 4G LTE) as soon as it is recognized that the UE is registered to IMS. Therefore, the process 200 can maintain the benefits provided by voice communication over newer technologies, such as HD voice for VoNP, if it is possible. Furthermore, the process 200 can reduce the wait time that is experienced by the user, by exiting the waiting procedure and continuing the voice call sooner if is possible (e.g., taking action to handle the voice call before the wait timer expires). Alternatively, if operation 220 determines that the IMS registration is not yet complete (shown as "No" in FIG. 2), the process 200 first checks if it should continue to wait prior to executing another voice call handling action. For instance, if operation 220 determines that the IMS registration still has a status of "in progress", the process 200 moves next to operation 230.

At operation 230, another conditional check is performed to determine whether the wait timer has expired. If the wait timer has not expired (shown as "No" in FIG. 2), and a current time associated with the process 200 waiting and holding the voice call is within the defined time period (e.g., current wait time≤wait timer) then the process 200 returns back to operation 220. According to the embodiments, the process 200 can iteratively perform the sub-process of operations 220-230 to continue the wait procedure for the entire time period defined by the wait timer, if necessary.

However, if operation 230 determines that the wait timer has expired (shown as "Yes" in FIG. 2), and the current time the process 200 has been waiting (and holding the voice call) has exceeded the defined time period (e.g., current wait time>wait timer) then the process 200 proceeds to exits the wait procedure and goes to operation 235.

Thereafter, at operation 235, it can be assumed that the IMS registration status has not completed successfully while the process 200 was holding the voice call and waiting. Referring back to the previous example, the condition that was considered to temporarily stall the IMS registration may have persisted throughout the wait period set by the wait timer. In an effort to not hold the voice call for an extended amount of time (e.g., greater than the wait timer) which may negatively impact the user's experience, the process 200 takes an action to handle the voice call upon expiration of the wait timer. Particularly, at fall back is performed at operation 235, where a legacy system is selected to conduct the voice call. Operation 235 involves selecting 2G or 3G for the RAT/cell to be used. In some cases, the RAT and the corresponding voice support is selected, based on the deployment. Further, operation 235 incudes bringing up circuit switched fallback (CSFB) for the UE originated voice session to be established and conducted. Also CSFB can be brought up without a user retry of the voice call, and thus does not require additional user interaction. Consequently, even if the IMS registration is not successfully completed over 5G, the disclosed process 200 ensures that a reliable CSFB is employed for the voice call to still be completed. The disclosed techniques can realize an improved user experience for voice calls over the 5G network, by successfully and efficiently completing a voice call in a scenario that would have otherwise resulted in a dropped call over 5G NR in many conventional voice services.

Figure 3:
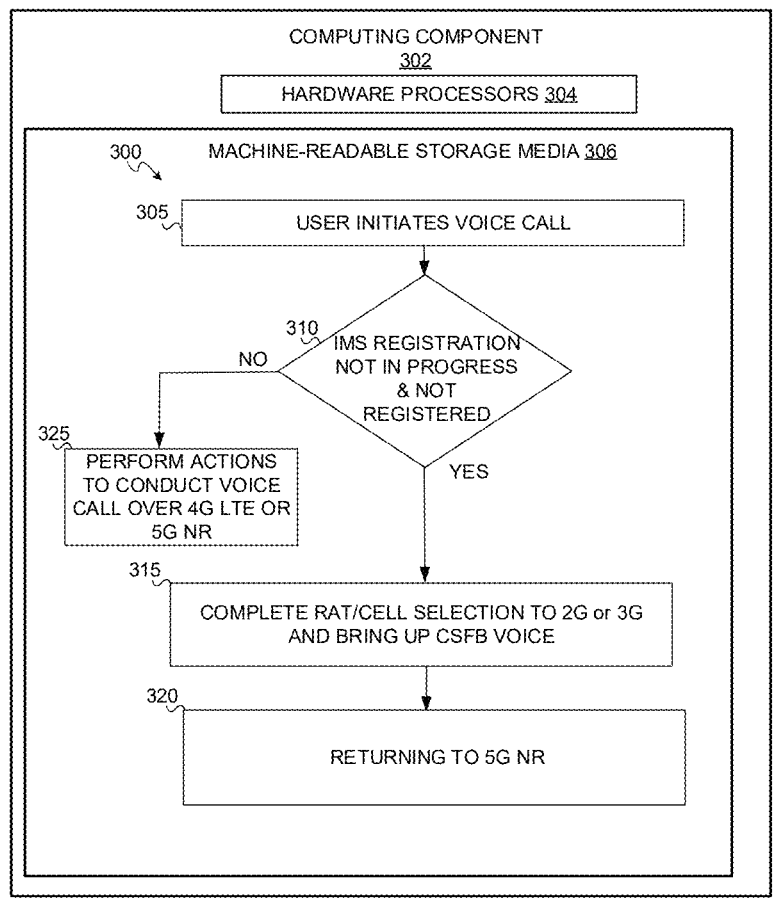
FIG. 3 is an operational flow diagram illustrating an example of another voice call over 5G flow handing procedure that is based on a status of IMS registration, in accordance with some embodiments.

FIG. 3 is a flowchart illustrating an example of another process 300 that can be performed as a different handling procedure for voice calls over 5G, according to one embodiment described herein. The process 300 can be generally described as the UE immediately falling back to a legacy system, namely a CS RAT, based on the IMS registration status, as oppossed to waiting for a set time period as described above in reference to FIG. 2. FIG. 3 illustrates this process 300 stored as executable operations in a machine-readable storage media 306 performed by a hardware processor 304. The computing component 302 may be the 5G-enabled mobile computer device (e.g., smartphone) described above in reference to FIG. 1, which is configured to perform the disclosed techniques.

At operation 305, the process 300 begins. At operation 305, the user initiates a voice call. For example, the user can employ a 5G-enabled mobile computing device (i.e., UE) for an outgoing voice call, which initiates a call flow for establishing a UE originated voice session over 5G NR. Then, the process 300 continues by performing a conditional check at operation 310 to determine the status of the IMS registration that is associated with the initiated voice call.

At operation 310, the conditional check can determine whether the IMS registration has a status that is not "complete" (e.g., the UE is not registered to IMS) and the IMS registration has a status that is not "in-progress" (e.g., the IMS registration procedure is not executing). For instance, the conditional check 305 may determine that the IMS registration has experienced some type of failure (rather than a temporary stall), and thus it may not be advantageous to wait for an additional time period in hopes of the IMS registration procedure successfully completing. In other words, in this case, operation 310 can ascertain that the UE cannot register in IMS due to an experienced issue. If the check determines that the IMS registration status is both not "complete" and not "in-progress" (shown by "Yes" in FIG. 3) during operation 310, then the process 300 proceeds to operation 315 to immediately fall back to a legacy system.

Thereafter, at operation 315, a RAT/cell selection of 2G or 3G is performed and the CSFB voice service is brought up. This particular flow for handling the voice call can avoid dropped calls that may otherwise occur in 5G NR if the IMS registration cannot be completed, by directing the UE to fall back to the CSFB as soon as an indication of a IMS registration failure is suggested by the status. The CSFB provides a fallback scheme that enables a handover during voice connection setup from NR (or LTE) to 2G or 3G circuit switched voice. CSFB does not require the IMS-based voice support, and thus eliminates the requirement to register to IMS (as required by voice over 5G NR) to conduct the voice call.

Referring back to operation 310, in the case where the check determines that the IMS registration status is "complete" or "in-progress", the process 300 can go to operation 325. At operation 325, call handling actions are performed that will ultimately conduct the voice call over 5G NR or 4G LTE. Operation 525 can include performing other call handling procedures of the embodiments, for example the wait procedure as described in reference to FIG. 2, if the IMS registration status is "in-progress".

After the UE initiated voice call is complete, the process 300 can continue to operation 320. Operation 320 involves disconnecting the call over CSFB, and returning the handover from CS RAT back to 5G NR. As a result, when the UE returns back to 5G NR (or 4G LTE), it can subsequently register to IMS. Thus, even if CSFB is needed to establish a single voice call, the UE does not have to continue to operate using CS RAT. Once the UE is able to successfully register to IMS, this flow allows the UE to retry its IMS registration procedure over 5G and to then conduct any subsequent voice calls over 5G NR which provides enhanced voice services, such as HD voice, for the user.

Handling a voice call over 5G, such as VoNR, needs to adapt to the existing network deployment, for example whether the network uses NSA mode or SA mode. Furthermore, the type of voice support in 5G depends on the available radio access technology (RAT). Some deployments may use an all PS domain architecture, where CS RAT is not available. Accordingly. 2G and 3G CS voice service may be removed in this deployment. Therefore, in deployments where voice services are only available in the PS domain, such as voice calls over 5G NR and 4G LTE, ensuring that the UE is successfully and efficiently registered in IMS is critical. The disclosed embodiments address these concerns, by employing a flow voice call handling that can retry the IMS registration in procedure in 4G LTE in response to an IMS registration failure in 5G. An example of another process 400 is illustrated in FIG. 4, that implements the aforementioned handling procedure for voice calls over 5G, according to one embodiment described herein.

Figure 4:
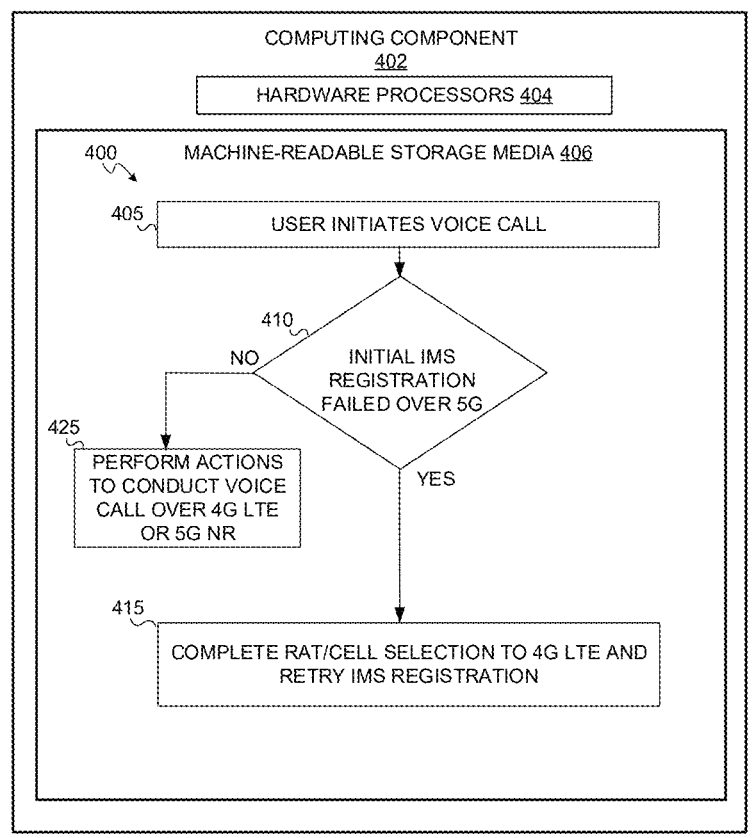
FIG. 4 is an operational flow diagram illustrating an example of a voice call over 5G flow handing procedure that is based on an IMS registration failure, in accordance with some embodiments.

FIG. 4 illustrates the process 400 stored as executable operations in a machine-readable storage media 406 performed by a hardware processor 404. The computing component 402 may be the 5G-enabled mobile computer device (e.g., smartphone) described above in reference to FIG. 1, which is configured to perform the disclosed techniques.

The process 400 begins at operation 405, where the user initiates a voice call. For example, the user can employ a 5G-enabled mobile computing device (i.e., UE) for an outgoing voice call, which initiates a call flow for establishing a UE originated voice session over 5G NR. Then, the process 400 continues by performing a conditional check at operation 410 to determine the status of the IMS registration that is associated with the initiated voice call. After a UE initiates a voice call, the UE attempts to register to the IMS over 5G (e.g., transmitting an IMS registration request to the 5GC) before the voice call can be connected. For example, a UE can register to the IMS over the 5G network via SIP. This requirement for a UE to be successfully registered to the IMS in order to support voice over 5G has been previously described in detail. Particularly, operation 410 checks to determine whether the UE's initial IMS registration has failed over 5G, due to this requirement for the UE to be registered to the IMS. Determining the occurrence of an IMS registration failure is even more critical in deployments where 2G and 3G voice services are unavailable, so falling back to circuit switch technology is not a viable option.

The process 400 continues to operation 415, if it is determined that the IMS registration status (associated with the UE's initial IMS registration request) is "failed" (shown as "Yes" in FIG. 4), indicating that there is an IMS registration failure over 5G. In some cases, operation 410 can determine that an IMS registration status of "not registered" or "not complete" is an indication of an IMS registration failure.

Subsequently, at operation 415, the process 400 does not retry the IMS registration in 5G. Instead, the process 400 immediately, upon determination of the IMS registration failure over 5G, completes a RAT/cell selection to 4G LTE. The UE can then retry to register to the IMS over 4G, as opposed to 5G again (where IMS registration has already failed). Thus, this voice call handling procedure may reduce delays associated with multiple attempts at IMS registration over 5G when there may be a higher probability of an IMS registration failure in 5G than compared to 4G. For example, it may be assumed that IMS registration on 4G LTE, which is a widely used legacy technology, may be more stable and/or reliable than 5G NR, as an emerging technology. After the retry in operation 415 is successful, and the UE is registered to the IMS, the UE originated voice call can still be completed in the PS domain over 4G LTE. Thus, by performing the IMS registration retry in 4G LTE sooner, the UE initiated voice call may be setup and established more efficiently to improve the user's experience (e.g., improving voice call success rate). Moreover, even if the UE cannot successfully register to IMS over 5G, this handling procedure may prevent the UE from completely losing voice service when the deployment does not enable handover to 2G and/or 3G for CS voice service.

Referring back to operation 410, in the case where the check determines that the IMS registration status does not indicate a IMS registration failure (e.g., IMS registration status is "complete", or "in-progress", etc.) the process 400 can go to operation 425. At operation 3425, call handling actions are performed that will ultimately conduct the voice call over 5G NR or 4G LTE. In some embodiments, operation 525 can include performing other call handling procedures of the embodiments, for example the wait procedure as described in reference to FIG. 2, if the IMS registration status is "in-progress".

Figure 5:
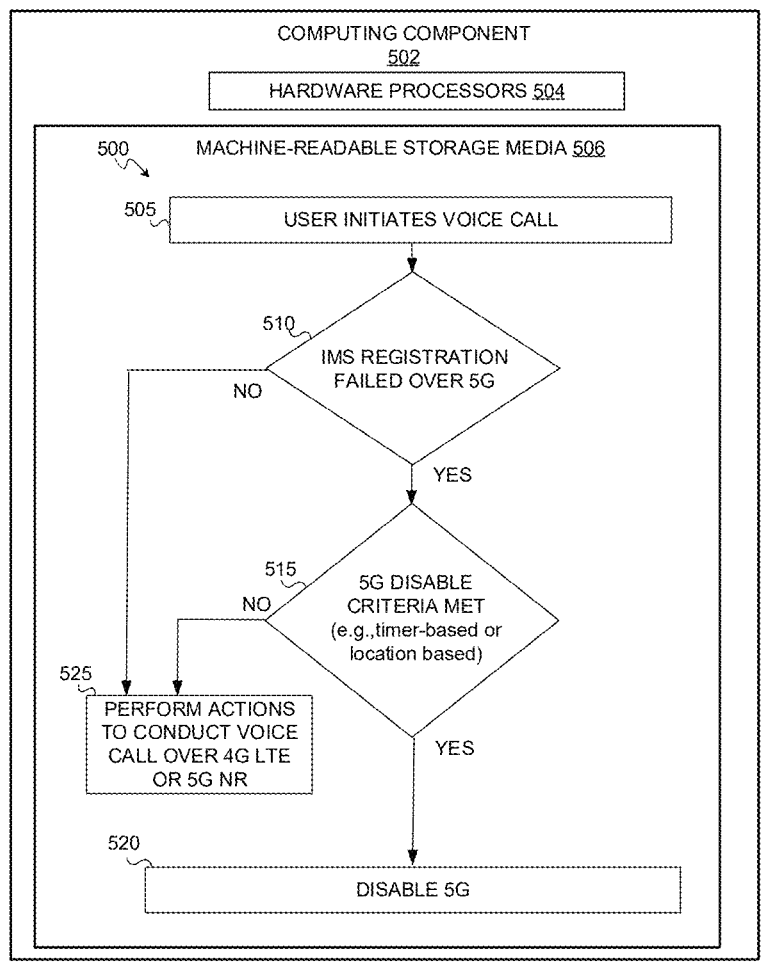
FIG. 5 is an operational flow diagram illustrating an example of another voice call over 5G flow handing procedure that is based on an IMS registration failure, in accordance with some embodiments.

FIG. 5 shows an example of another process 500, which implements yet another handling procedure for voice calls over 5G, according to one embodiment described herein. Similar to the procedure described above in reference to FIG. 4, process 500 also implements a flow that handles a voice call when there are IMS registration failures over 5G NR.

FIG. 5 illustrates the process 500 stored as executable operations in a machine-readable storage media 506 performed by a hardware processor 504. The computing component 502 may be the 5G-enabled mobile computer device (e.g., smartphone) described above in reference to FIG. 1, which is configured to perform the disclosed techniques.

The process 500 begins at operation 505, where the user initiates a voice call. For example, the user can employ a 5G-enabled mobile computing device (i.e., UE) for an outgoing voice call, which initiates a call flow for establishing a UE originated voice session over 5G NR. Then, the process 500 continues by performing a conditional check at operation 410 to determine the status of the IMS registration that is associated with the initiated voice call. Operation 510 checks to determine whether the UE's IMS registration has failed over 5G. Alternatively, in some embodiments, process 500 adjusts the flow for handling the voice call based on the status of the voice call itself, in lieu of (or in addition to) the status of IMS registration. Accordingly, in this embodiment, operation 510 involves determining whether the voice call initiated in previous operation 505, failed to connect. This embodiment may be suitable when the objective is to disable 5G in more extreme cases, for instance when there are a high volume of voice calls being dropped over 5G.

The process 500 continues to operation 515, if it is determined that the IMS registration status (associated with the UE's initial IMS registration request) is "failed" (shown as "Yes" in FIG. 4), indicating that there is an IMS registration failure over 5G. This embodiment may be suitable when the objective is to disable 5G at an earlier indication of issues over 5G that can impact voice calls. Consequently, by considering the IMS registration status, as opposed to waiting until there is a full voice call failure, the handling procedure may substantively reduce the number of voice calls that are dropped over 5G (e.g., improving the voice call success rate over 5G). In some cases, operation 510 can determine an IMS registration status of "not registered" or "not complete" as an indication of an IMS registration failure, and process 500 will continue to operation 515 based on identifying these IMS registration statuses.

Thereafter, at operation 515, the process 500 performs another conditional check to determine whether a 5G disable criteria has been met. A 5G disable criteria is one or more parameters and/or conditions that are defined and stored by the UE, and will trigger the 5G to be disabled upon recognizing that a current identified condition associated with the UE matches a stored condition defining the 5G disable criteria. According the embodiments, the 5G disable criteria can be timer-based on location-based. With respect to timer-based criteria, a 5G disable timer can be implemented. For example, the process 500 can initiate the 5G disable timer upon detecting a first occurrence of a IMS registration failure for the UE. The 5G disable timer continues to run even after the completion of the voice call associated with the first IMS registration failure. Then, if process 500 encounters one or more subsequent IMS registration failures for the UE before the 5G disable timer has expired, then operation 515 determines that the 5G disable criteria (timer-based) has been met (shown as "Yes" in FIG. 5). The 5G disable timer can be set from a plurality of time intervals, for example 10 minutes, 20 minutes, 30 minutes, 60 minutes, as deemed appropriate. In some embodiments, the 5G disable timer can automatically reset if the time period has expired without detecting another IMS registration failure of the UE.

With respect to location-based criteria, one or more 5G failure locations can be defined. A 5G failure location can be based on historical data associated with IMS registration failures that have been previously observed for the UE, or other related UEs (e.g., same cellular service provider. UEs same user, etc.). For instance, if multiple IMS registration failures over 5G have been identified in the past for the UE, where the failures have occurred approximately within the same area (e.g., within a defined radius), that location can be defined as a known 5G failure location and added to the stored 5G disable criteria. The location corresponding to an IMS registration failure may be identified using one or a combination of location tracking mechanisms that may be implement by the UE or 5G network, including but not limited to: identifying the 5G cell ID; TAC; GPS location data, and the like. As an example, the process 500) can determine that the UE has had an IMS registration failure, which triggers the UE to immediately detect its location (using one of the abovementioned location tracking mechanisms) at the time of the failure. Thus, the GPS coordinates, for example, indicating the UE's location can be corresponded to that instance of an IMS registration failure. Therefore, operation 515 can involve detecting a current location of the UE, which experienced the IMS registration failure in previous operation 510. The UE's current location can be compared to the 5G failures locations in the defined 5G failure criteria. If it is determined that the UE's current location is approximately in the same area as one of the know 5G failures locations (e.g., within a defined radius) then operation 515 considers the UE to be in a 5G failure location, and further that the 5G disable criteria (location-based) has been met (shown as "Yes" in FIG. 5).

In some embodiments, if at least one 5G disable criteria has been met in operation 515, then the process 500 considers it as an indication that the UE is experiencing a condition (e.g., in a location, within an outage time, within a configuration issue time, etc.) where there is a high likelihood that issues over 5G will persist. For instance, the UE may be currently in a location where there is poor 5G coverage, and thus voice call failures, are known to be persistent based on historical data. Therefore, this handling procedure endeavors to temporarily disable 5G on the UE, when the recent failure over 5G may be linked to an issue that is, by and large, continuously problematic. Accordingly, operation 520 can reconfigure the UE such that 5G is disabled. Subsequently, while 5G is disabled, the UE can utilize voice services via legacy systems, for example 4G LTE. 3G CS RAT, as deemed appropriate.

The process 500 performs operation 525 in cases when operation 510 determines that the IMS registration has not failed, or when operation 515 has determined that an 5G disable criteria has not been met. As a result, process 500 can handle the voice call without disabling 5G. At operation 525, call handling actions are performed that will ultimately conduct the voice call over 5G NR or 4G LTE. Operation 525 can include performing other call handling procedures of the embodiments, for example the wait procedure as described in reference to FIG. 2, if the IMS registration status is "in-progress".

Figure 6:
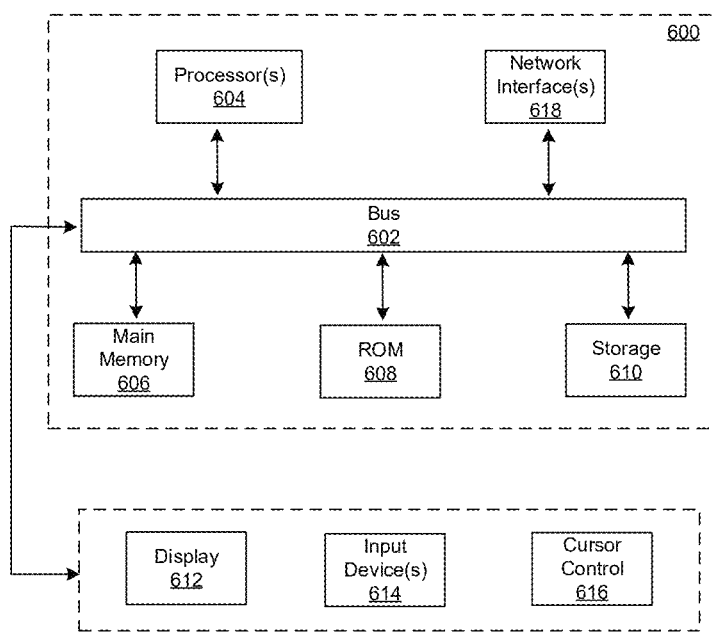
FIG. 6 is a block diagram of an example computing component or device for implementing the disclosed techniques, in accordance with the disclosure.

FIG. 6 depicts a block diagram of an example computer system 600 (which may also referred to as the voice call device) in which various features described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random-access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media." and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM. NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines. As used herein, a circuit might be implemented utilizing any form of hardware, software, or a combination thereof. For example, one or more processors, controllers, ASICs, PLAs, PALS, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 800.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A voice call device, comprising:
one or more processors; and
a memory having instructions stored thereon, which, when executed by the one or more processors, cause the one or more processors to:
initiate a voice call, wherein the voice call comprises a voice session over 5G new radio (NR) initiated via a user equipment (UE);
determine a status of a registration to an IP Multimedia Subsystem (IMS) for the UE;
in response to determining that the status of registration to the IMS for the UE indicates that the registration to the IMS for the UE has failed,
determine a 5G disable criteria has been met by the UE; and
in response to determining that the 5G disable criteria has been met by the UE, disable 5G on the UE.

2. The voice call device of claim 1, wherein the 5G disable criteria comprises a timer-based 5G disable criteria.

3. The voice call device of claim 2, wherein the one or more processors are further configured to:
initiate a 5G disable timer upon detecting a first occurrence of an IMS registration failure for the UE; and prior to the 5G disable timer expiring, detect a subsequent occurrence of an IMS registration failure for the UE and determine that the timer-based 5G disable criteria has been met by the UE.

4. The voice call device of claim 1, wherein the 5G disable criteria comprises a location-based 5G disable criteria.

5. The voice call device of claim 4, wherein the one or more processors are further configured to:
  in response determining that the status of registration to the IMS for the UE is failed, detect a current location of the UE at the time of the registration failure;
  compare the current location of the UE to 5G failures locations defined by the location-based 5G disable criteria; and
  upon determining that the current location of the UE is approximately in the same area as one or more of the 5G failures locations, determine that the location-based 5G disable criteria has been met by the UE.

6. The voice call device of claim 5, wherein the current location of the UE may be identified using one or a combination of location tracking mechanisms implement by the UE or 5G network.

7. The voice call device of claim 1, wherein the one or more processors are further configured to:
  in response to disabling 5G on the UE, conduct the voice call as a voice session over 4G Long-term Evolution (LTE).

8. The voice call device of claim 1, wherein the one or more processors are further configured to:
  conduct, in response to determining that the 5G disable criteria has not been met by the UE, the voice call as a voice session over 5G NR or 4G Long-term Evolution (LTE).

* * * * *